US010438150B2

(12) United States Patent
Stanlake et al.

(10) Patent No.: US 10,438,150 B2
(45) Date of Patent: Oct. 8, 2019

(54) ENERGY INTENSITY VARIABILITY ANALYSIS

(71) Applicant: SCHNEIDER ELECTRIC USA INC., Palatine, IL (US)

(72) Inventors: Matthew Stanlake, Victoria (CA); Michael Brian MacKenzie, Victoria (CA); Mohammad Amin Cheraghi Shirazi, Victoria (CA)

(73) Assignee: SCHNEIDER ELECTRIC USA, INC., Palatine, IL (US)

( * ) Notice: Subject to any disclaimer, the term of this patent is extended or adjusted under 35 U.S.C. 154(b) by 1107 days.

(21) Appl. No.: 14/753,610

(22) Filed: Jun. 29, 2015

(65) Prior Publication Data
US 2016/0379147 A1   Dec. 29, 2016

(51) Int. Cl.
  *G06Q 10/06*   (2012.01)
  *G06Q 10/04*   (2012.01)
  *G06Q 50/06*   (2012.01)

(52) U.S. Cl.
  CPC ....... *G06Q 10/06313* (2013.01); *G06Q 10/04* (2013.01); *G06Q 10/06* (2013.01); *G06Q 50/06* (2013.01); *Y02P 90/82* (2015.11); *Y02P 90/86* (2015.11)

(58) Field of Classification Search
  None
  See application file for complete search history.

(56) References Cited

U.S. PATENT DOCUMENTS

| 6,424,959 | B1 * | 7/2002 | Bennett, III | G06F 17/505 706/13 |
| 8,356,000 | B1 * | 1/2013 | Koza | G06N 3/126 706/13 |
| 2002/0035496 | A1 | 3/2002 | Fukushima et al. | |
| 2006/0227740 | A1 * | 10/2006 | McLaughlin | H04W 84/20 370/329 |
| 2007/0050650 | A1 * | 3/2007 | Conroy | G06F 1/26 713/300 |
| 2009/0099887 | A1 * | 4/2009 | Sklar | G06Q 10/00 705/7.41 |
| 2010/0100215 | A1 * | 4/2010 | Akahori | G06Q 10/06 700/99 |

(Continued)

FOREIGN PATENT DOCUMENTS

| CN | 101320098 A | 12/2008 |
| CN | 102929232 A | 2/2013 |

(Continued)

OTHER PUBLICATIONS

Extended European Search Report from corresponding European Application No. 16176057.4 dated Oct. 11, 2016.

*Primary Examiner* — Leland Marcus
(74) *Attorney, Agent, or Firm* — Lando & Anastasi, LLP

(57) ABSTRACT

A method for reducing energy costs at a facility includes identifying candidate production entities at the facility having a high potential for energy intensity variation reduction, determining potential cost savings associated with reducing energy intensity variation in the candidate production entities, identifying a root cause for energy intensity variation in the candidate production entities, and causing an action to be performed to mitigate the root cause.

16 Claims, 16 Drawing Sheets

(56) References Cited

U.S. PATENT DOCUMENTS

| | | | |
|---|---|---|---|
| 2010/0274377 A1* | 10/2010 | Kaufman | G06Q 10/06 700/103 |
| 2010/0274602 A1* | 10/2010 | Kaufman | G06Q 10/04 705/7.38 |
| 2011/0095897 A1 | 4/2011 | Sutrave | |
| 2011/0231028 A1 | 9/2011 | Ozog | |
| 2011/0270450 A1* | 11/2011 | Gujjar | G06Q 10/00 700/287 |
| 2012/0158361 A1 | 6/2012 | Raman et al. | |
| 2012/0158603 A1* | 6/2012 | Ameling | G06Q 10/06 705/317 |
| 2014/0067140 A1 | 3/2014 | Gow | |
| 2016/0079756 A1* | 3/2016 | Ikeyama | G06Q 50/04 700/287 |
| 2017/0168552 A1* | 6/2017 | Mishina | G06F 1/3293 |

FOREIGN PATENT DOCUMENTS

| | | |
|---|---|---|
| CN | 103870678 A | 6/2014 |
| CN | 104676752 A | 6/2015 |
| WO | 2013089782 A2 | 6/2013 |

\* cited by examiner

ENERGY INTENSITY VARIABILITY ANALYSIS

BACKGROUND

1. Field of Invention

Aspects and embodiments of the present disclosure are directed to systems and methods for providing energy management services to customers.

2. Discussion of Related Art

One key goal of an energy management system is to find energy savings opportunities, but even with a monitoring system in place, finding these opportunities can be challenging. Large energy loads are commonly targeted, but these loads may not offer the best opportunities for low-cost savings.

SUMMARY

In accordance with an aspect of the present disclosure, there is provided a method for reducing energy costs at a facility. The method comprises identifying candidate production entities at the facility having a high potential for energy intensity variation reduction, determining potential energy and/or energy cost savings associated with reducing energy intensity variation in the candidate production entities, identifying a root cause for energy intensity variation in the candidate production entities, and causing an action to be performed to mitigate the root cause.

In some embodiments, the candidate production entities are identified through compression pre-testing. The compression pre-testing may include combining a first energy intensity dataset associated with a first group of variables with a second energy intensity dataset statistically similar to the first data set and associated with a second group of variables into a composite macro group variable for analysis. The compression pre-testing may further include combining statistically similar datasets associated with a plurality of groups of variables into a plurality of composite macro group variables, each of the composite macro group variables having statistically different associated data sets. The root cause may be identified through analysis of parameters of variables included in each macro group variable.

In some embodiments, the compression pre-testing includes ranking of parameters derived from each of variability of energy intensity, energy intensity skewness, and total amount of production for each of the candidate production entities.

In some embodiments, the potential cost savings are determined through compression analysis.

In some embodiments, identifying the root cause for energy intensity variation in the candidate production entities includes determining a time of a change in energy intensity variation in the candidate production entities though a method of change-point detection. The method of change-point detection may include a bootstrapping analysis. The method of change-point detection may include a Mean Square Error analysis. The method of change-point detection may include a BS-MSE analysis. The method of change-point detection may include a relative standard deviation analysis.

In some embodiments, the root cause is determined by comparison of a signature of the energy intensity variation in the candidate production entities with a database of energy intensity variation signatures and associated root causes.

In some embodiments, causing the action to be performed to mitigate the root cause includes causing an adjustment to be made to one or more operating parameters of one or more of the candidate production entities and/or to one or more operating parameters of an ancillary system associated with the one or more of the candidate production entities.

In accordance with another aspect, there is provided a computer system including a processor configured to perform a method comprising identifying candidate production entities at the facility having a high potential for energy intensity variation reduction, determining potential cost savings associated with reducing energy intensity variation in the candidate production entities, identifying a root cause for energy intensity variation in the candidate production entities, and causing an action to be performed to mitigate the root cause.

In some embodiments, the computer system further comprises an output device configured to provide control signals to one or more of the candidate production entities, wherein causing the action to be performed to mitigate the root cause includes adjusting one or more operation parameters of the one or more of the candidate production entities by providing one or more control signals to the one or more of the candidate production entities.

In some embodiments, the computer system further comprises an output device configured to provide control signals to one or more ancillary systems associated with one or more of the candidate production entities, wherein causing the action to be performed to mitigate the root cause includes adjusting one or more operation parameters of the one or more of the ancillary systems by providing one or more control signals to the one or more of the ancillary systems.

In some embodiments, the computer system is configured to identify the root cause for energy intensity variation in the candidate production entities by a method including determining a time of a change in energy intensity variation in the candidate production entities though a method of change-point detection.

In some embodiments, the computer system further comprises a database, wherein the processor is configured to determine the root cause is by comparing a signature of the energy intensity variation in the candidate production entities with energy intensity variation signatures and associated root causes stored in the database.

In accordance with another aspect, there is provided a non-transitory computer readable media including instructions that when executed on a computer system cause the computer system to perform a method comprising identifying candidate production entities at the facility having a high potential for energy intensity variation reduction, determining potential cost savings associated with reducing energy intensity variation in the candidate production entities, identifying a root cause for energy intensity variation in the candidate production entities, and causing an action to be performed to mitigate the root cause.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
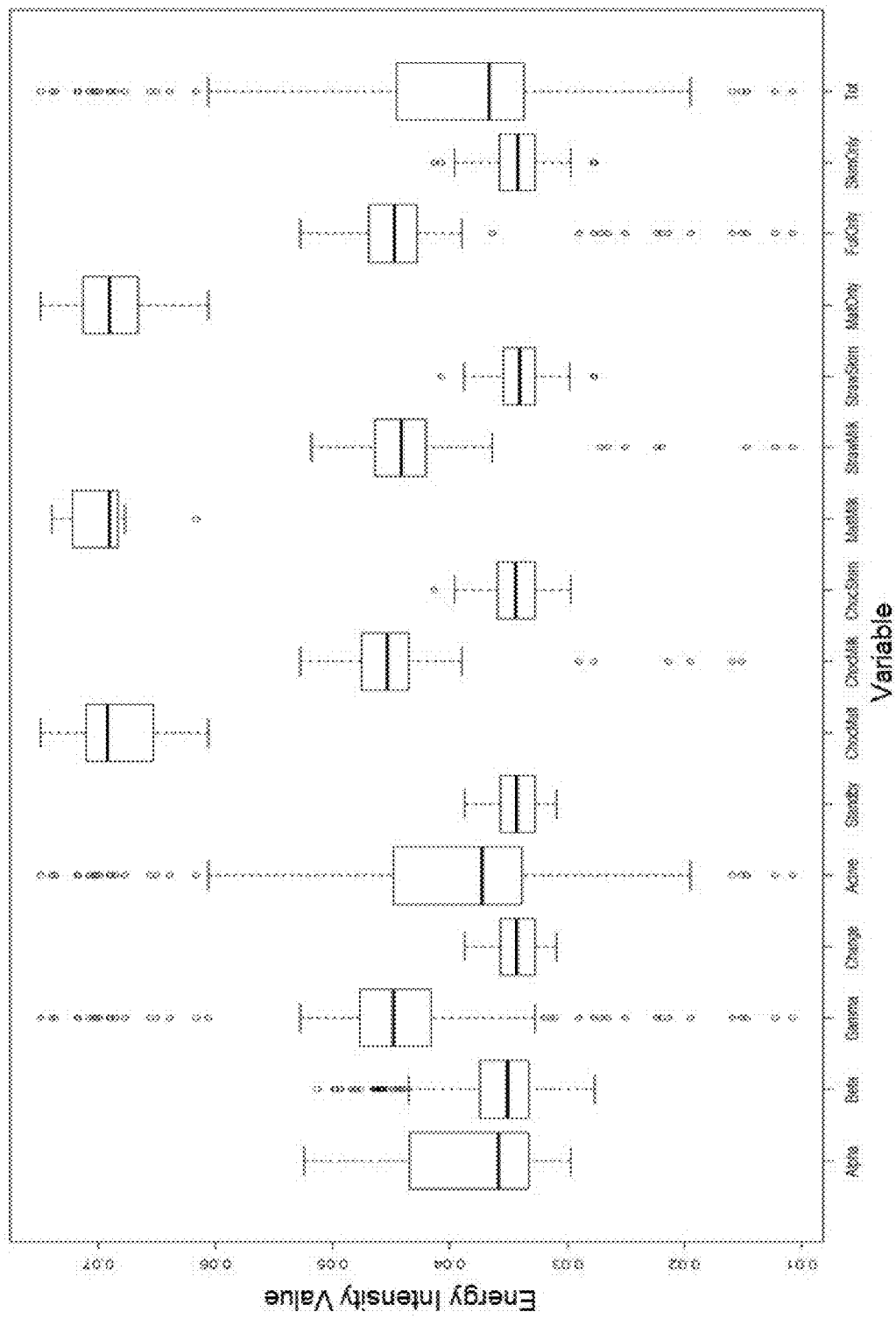
FIG. 1 is a box chart of energy intensity values for variables in an example system.

This disclosure is not limited in its application to the details of construction and the arrangement of components set forth in the following description or illustrated in the drawings. The disclosed systems and methods are capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Various aspects and embodiments disclosed herein include systems and methods for providing energy management services to customers. Aspects and embodiments disclosed herein include a combination of one or more monitoring devices and a central processor at a hosted service configured to gather data from a customer site, identify energy and production systems events of interest, and analyze the energy and production system events of interest to determine and recommend and/or implement vendor services designed to increase energy savings and/or reduce variability in energy intensity.

Aspects and embodiments disclosed herein include an energy services recommendation system that combines monitoring devices and a hosted data analysis processor to automatically identify possible energy services of value to a customer.

Aspects and embodiments of an energy service monitor and recommendation system include one or more energy and production system monitoring devices. The energy system monitoring devices are configured to measure a variety of energy system parameters of a customer's system and the production system monitoring devices collect relevant data on the output or drivers of the facility. The system analyzes the collected measurement data to highlight energy system events of interest, for example, those events that represent opportunities to increase energy system savings. At least some embodiments provide control signals to devices of the energy or production systems or coupled to the energy system to provide increased savings and/or reliability.

The energy services recommendation system includes a central processor in communication with the monitoring devices and/or with a database of energy system events at a customer's facility. The central processor receives data representing energy system events of interest from one or more of the energy system monitoring devices or database of energy system events and further processes the data to explore the opportunities available to provide further energy savings and/or increased reliability. In some embodiments, the analysis provided by the central processor may be offered as a hosted service by a vendor. In accordance with some embodiments, a service is offered by a vendor to address the potential opportunity discovered by the combination of one or more of the energy system monitoring devices and the central processor. Examples of such services include an energy performance contract, an energy audit to further quantify energy conservation measures and associated energy savings, ongoing preemptive maintenance, and optimization commissioning of existing energy system configurations.

In some embodiments, individual monitoring devices include functionality to identifying potential energy system events of interest. The functionality of the individual monitoring devices to identifying potential energy system events of interest may or may not be accessible or modifiable through a customer-visible interface. A customer may opt-in to allow the monitoring devices to communicate with the central processor and receive service offers from a vendor. The monitoring devices apply the functionality to identify events of interest, and transmit relevant data to the central processor. In other embodiments, the monitoring devices provide the data to a customer's computer system which then communicates said data to an external data analysis system including the central processor as disclosed herein. Such relevant data may include metadata that helps add context to the captured events of interest, for example, site geographical location, type of equipment monitored, and/or customer industry. In some embodiments, specific functionality operates on the measured data to automatically determine this metadata, for example, to determine if a monitor is being used to track a heating ventilation and air conditioning (HVAC) unit vs. a rack of computer servers.

In some embodiments, the central processor may apply sophisticated analysis to the data received from the monitoring devices to refine the list of recommended services that would be of value to the customer. The central processor may acquire data from other sources to combine with the data received from the monitors as part of the analysis step, and may compare analysis results from one customer site with results generated for other similar customer sites to facilitate formulation of the best service recommendations.

The central processor may generate a list of recommended services for the customer to consider. This list may be sent automatically to a designated customer contact, or may be reviewed by a service vendor employee beforehand, with relevant recommendations finally being offered to the customer.

Aspects and embodiments disclosed herein are related to identifying energy savings opportunities for facilities including, for example, factories, office buildings, and residential buildings. In some embodiments, points in an energy system with large variations in energy intensity are identified and actions are taken to improve operation of the energy system to eliminate high-intensity events.

Building on concepts from statistical process control (SPC), aspects and embodiments disclosed herein provide a method for examining variability in energy intensity and quantifying the savings possible through "compression" analysis. This analysis examines the distribution of energy intensity values (in units such as kWh/ton) involved in generating some output (for example, an amount of product at a factory). Energy intensity refers to the amount of energy consumed per unit of production. Energy intensity distributions with a large positive "skew" towards high energy intensity values for a given production output are said to be highly compressible. Targeting and eliminating these high-intensity events may offer significant cost savings opportunities.

Some aspects and embodiments disclosed herein provide for reducing costs associated with energy consumption at a facility by performing a method including:

A) Compression pre-testing: Energy intensity variables are tested for compressibility and prioritized for compression analysis. This step tests for variability in energy intensity that is associated with large energy driver values (such as production output). This step may be applied when there are a large number of variables that can impact energy intensity.

B) Compression analysis: Energy intensity and associated energy consumption interval data are grouped by the number of standard deviations away from the mean of the energy intensity values. Energy consumption values for energy intensity values that are more than 4 standard deviations (or 4 sigma) away from the mean, for example, can be summed to calculate the total energy savings available if such high-intensity events are reduced to all be exactly 4 sigma away from the mean; and C) Visualization of analysis results: A variety of charts may be created and utilized to present the energy savings available and help identify the causes of high-intensity events. A line chart, for example, can show the increasing energy savings available as energy intensity values are compressed closer to the mean value. A box plot can illustrate the distribution of energy intensity values sliced by one or more categories (such as production crew).

Compression Pre-Testing (Priority Assessment):

Compression pre-testing, as the term is used herein, refers to a pre-test to rank variables related to energy intensity and associated energy consumption for compression analysis to determine which variables have the greatest impact on energy intensity and therefore the best opportunities for the reduction in energy consumption costs. An example of a method of performing a compression pre-test will now be presented using a hypothetical dairy plant dataset. This example assumes that the data regarding energy intensity has already been collected and associated with various variables of interest.

Table 1 below illustrates an initial set of variables considered to contribute to energy intensity variation at a hypothetical dairy plant:

TABLE 1

Dairy Plant Variables

| Crew | Factory Status | Mixer Mode | Recipe |
|---|---|---|---|
| Alpha | Active | MaltOnly | ChocMalt |
| Beta | Standby | FullOnly | ChocMilk |
| Gamma | | SkimOnly | ChocSkim |
| Change | | | MaltMilk |
| | | | StrawMilk |
| | | | StrawSkim |

To provide an initial view of the variability in energy intensity associated with each of these variables, a box plot of raw energy intensity data may be created. This box plot is presented in FIG. 1.

"Micro Groups" representing a combination of each of the variables shown in Table 1 may be created. The maximum number of the smallest possible groups (Micro Groups) is the product of number of initial variables. In the presented example, there will potentially be 4×2×3×6=144 Micro Groups. However, there might be no data for some of the groups. In such instances, the number of Micro Groups will be smaller than the maximum number of possible Micro Groups. Eliminating Micro Groups containing no data in this hypothetical example leaves the following 16 Micro Groups having the specifications illustrated in Table 2 below:

TABLE 2

Non-trivial Micro Groups

| Micro Groups | Crew | Fac Status | Mixer mode | Recipe |
|---|---|---|---|---|
| v_3114 | Gamma | Active | MaltOnly | MaltMilk |
| v_3111 | Gamma | Active | MaltOnly | ChocMalt |
| v_3125 | Gamma | Active | FullOnly | StrawMilk |
| v_3122 | Gamma | Active | FullOnly | ChocMilk |
| v_2125 | Beta | Active | FullOnly | StrawMilk |
| v_1122 | Alpha | Active | FullOnly | ChocMilk |
| v_2122 | Beta | Active | FullOnly | ChocMilk |
| v_1125 | Alpha | Active | FullOnly | StrawMilk |
| v_4236 | ShiftChange | Standby | SkimOnly | StrawSkim |
| v_1136 | Alpha | Active | SkimOnly | StrawSkim |
| v_1133 | Alpha | Active | SkimOnly | ChocSkim |
| v_4233 | ShiftChange | Standby | SkimOnly | ChocSkim |
| v_2133 | Beta | Active | SkimOnly | ChocSkim |
| v_2136 | Beta | Active | SkimOnly | StrawSkim |
| v_3133 | Gamma | Active | SkimOnly | ChocSkim |
| v_3136 | Gamma | Active | SkimOnly | StrawSkim |

In Table 2, the Micro Group designations are derived from the variables specified in each Micro Group. For example, Micro Group v_3114 includes crew Gamma, which is third in the list of crews in Table 1, a factory status of active, which is first in the list of factory statuses in Table 1, Mixer mode MaltOnly, which is first in the list of Mixer modes in Table 1, and a recipe of MaltMilk, which is fourth in the list of recipes in Table 1.

Figure 2:
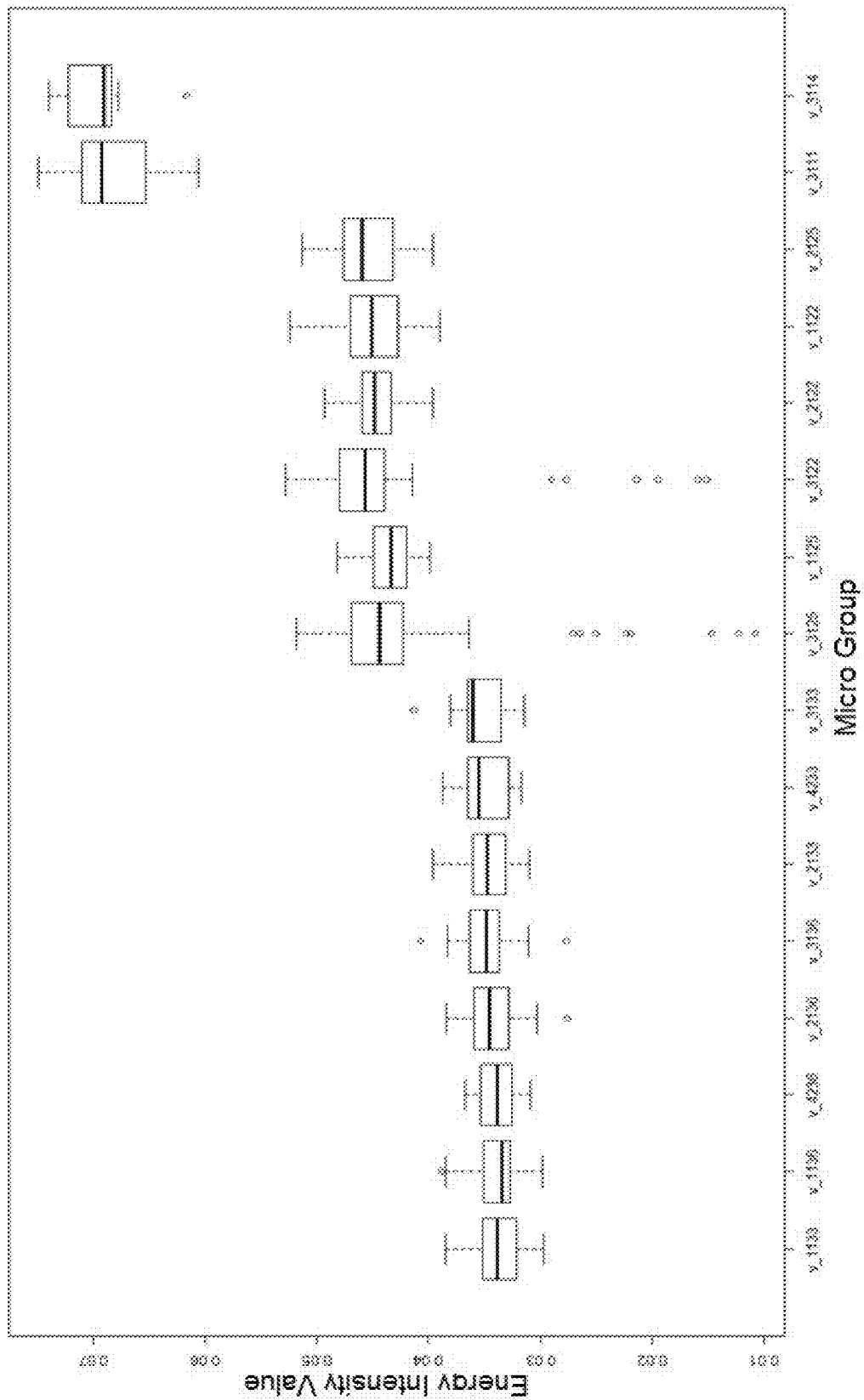
FIG. 2 is a box chart of energy intensity values for composite variables derived from the variables of the box chart of FIG. 1.

Sorting the Micro Groups based on their mean energy intensity values and plotting them on a box plot yields the box plot illustrated in FIG. 2.

Now that the Micro Groups and their respective energy intensity distributions are defined, statistical tools may be utilized to find out if any of the Micro Groups are statistically similar. The ANOVA and Tukey's test may be utilized to determine if the means of various Micro Groups are the same and the Bartlett's test, assuming the normality of distributions, will tell if the variances are the same. The output of these tests is a p-value which will define the significance level. Therefore, a significance threshold level should be defined to use as a sensitivity level. In some embodiments, 0.05 may be a desirable sensitivity level. The lower the sensitivity, the higher number Micro Groups will merge. The sensitivity level used for the current example is 0.02. An example of a method for performing the merging of the Micro Groups is illustrated in the flowchart of FIG. 3, indicated generally at 300.

Figure 3:
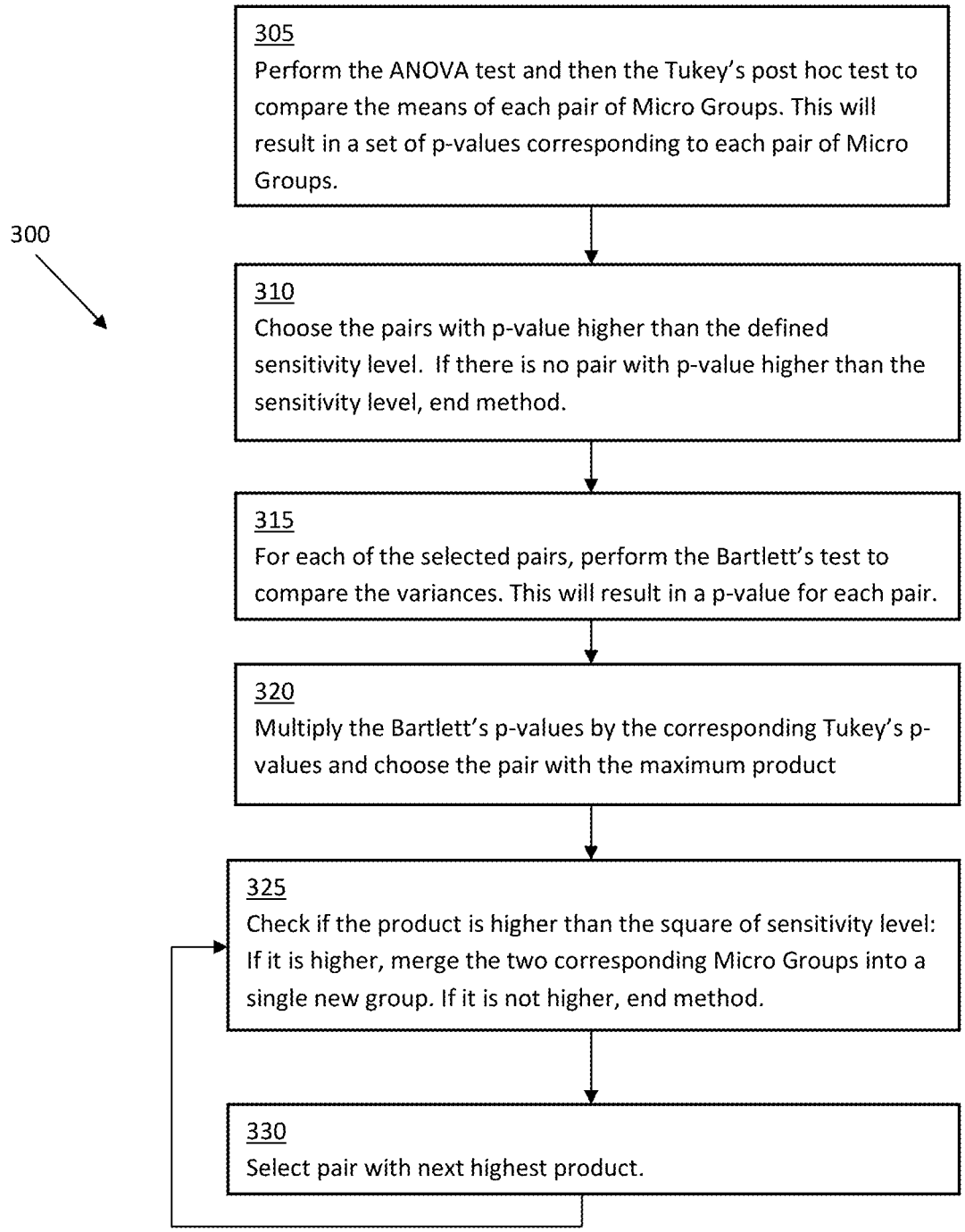
FIG. 3 is a flow chart of a method for ranking variables in a method of compression pre-testing.

The method illustrated in FIG. 3 includes the following acts: In act 305 the ANOVA test and then the Tukey's post hoc test are performed to compare the means of each pair of Micro Groups. This will result in a set of p-values corresponding to each pair of Micro Groups. In act 310 the pairs of Micro Groups with p-value higher than a defined sensitivity level are selected. If there is no pair with a p-value higher than the sensitivity level the method ends and no Micro Groups are merged. In act 315, for each of the selected pairs of Micro Groups, the Bartlett's test is performed to compare the variances of the groups in the pairs of Micro Groups. This will result in a second p-value for each pair. In act 320, the Bartlett's p-values are multiplied by the corresponding Tukey's p-values. The Micro Group pair having the highest value of this product is selected. In act 325 a comparison is performed between the product of the p-values and is the square of sensitivity level. If the product is higher than the square of the sensitivity level, the two corresponding Micro Groups are merged into a single new group. The pair of Micro Groups having the next highest product of p-values is then selected (act 330). If the product is not higher than the square of the sensitivity level, the method ends and no further Micro Groups are merged (act 325).

Figure 4:
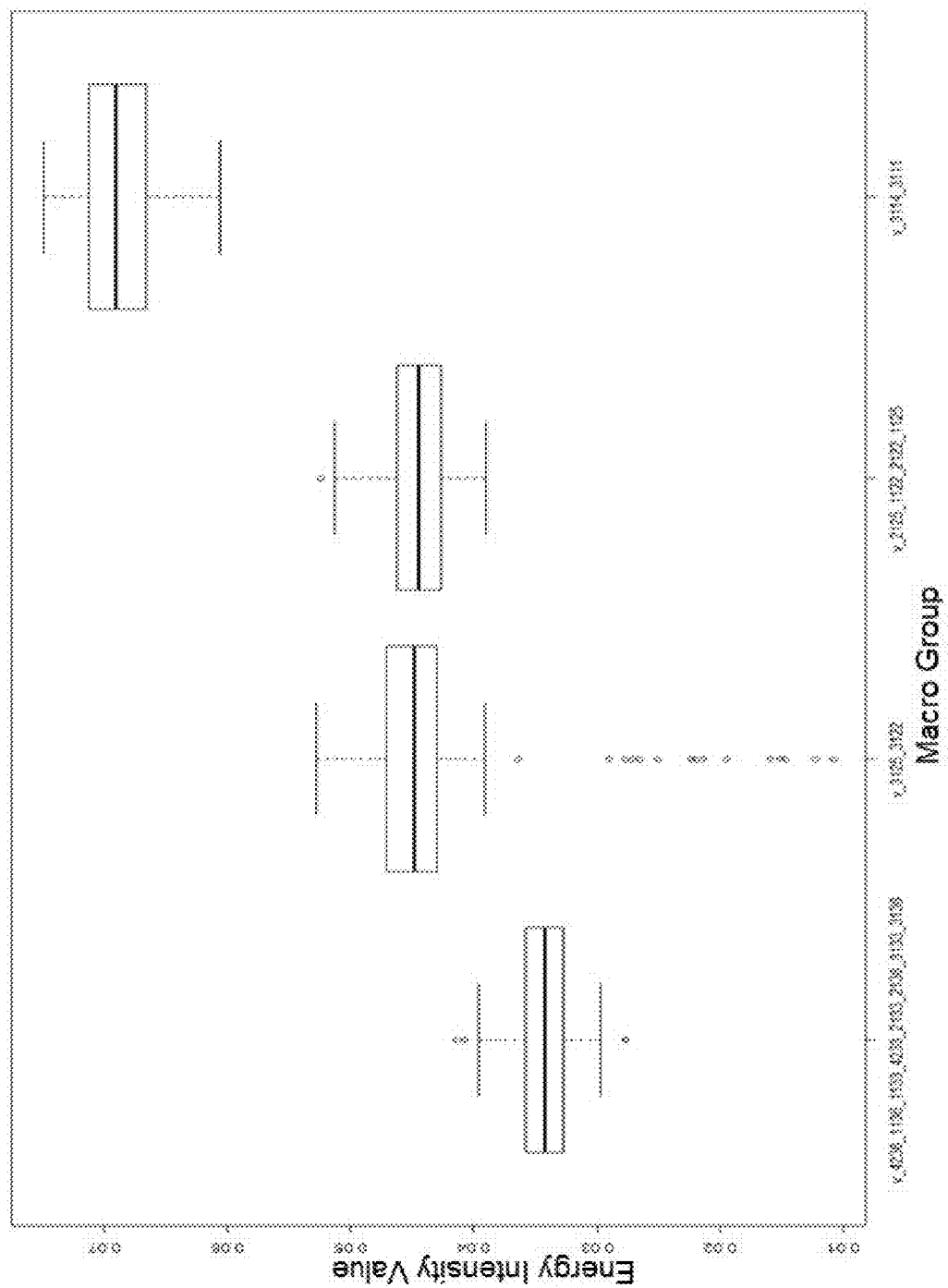
FIG. 4 is a box chart of energy intensity values for composite variables derived from the variables of the box chart of FIG. 2.

Doing this procedure, one will end up with a new set of groups which may be referred to as Macro Groups. None of these Macro Groups are statistically similar to each other. Therefore, looking to the details of these groups will be potentially informative. The following Table 3 and the box plot illustrated in FIG. 4 showing the four Macro Groups of this example, resulted from this analysis. In Table 3 and FIG. 4, the Macro Group designations are concatenations of the Micro Group designations that were combine to make the respective Macro Groups.

between crews may be a factor contributing to energy intensity variation that should be further investigated. Crew "Gamma" has a high variance in producing "FullOnly" compared with other crews.

It should be noted that the above is only one example used to illustrate an approach for performing a compression pre-test. More complex datasets may be analyzed using a similar technique.

Another embodiment of a method of performing a compression pre-test may be utilized where a system includes distinct factors suspected to contribute to energy intensity variation, but which are not suspected to interact with one another. For example, a factory may have a group of a same type of machine or duplicate production lines and it may be desirable to identify a particular sub-set of the groups of machines or production lines that should be subject to detailed energy intensity variability analysis.

Figure 5:
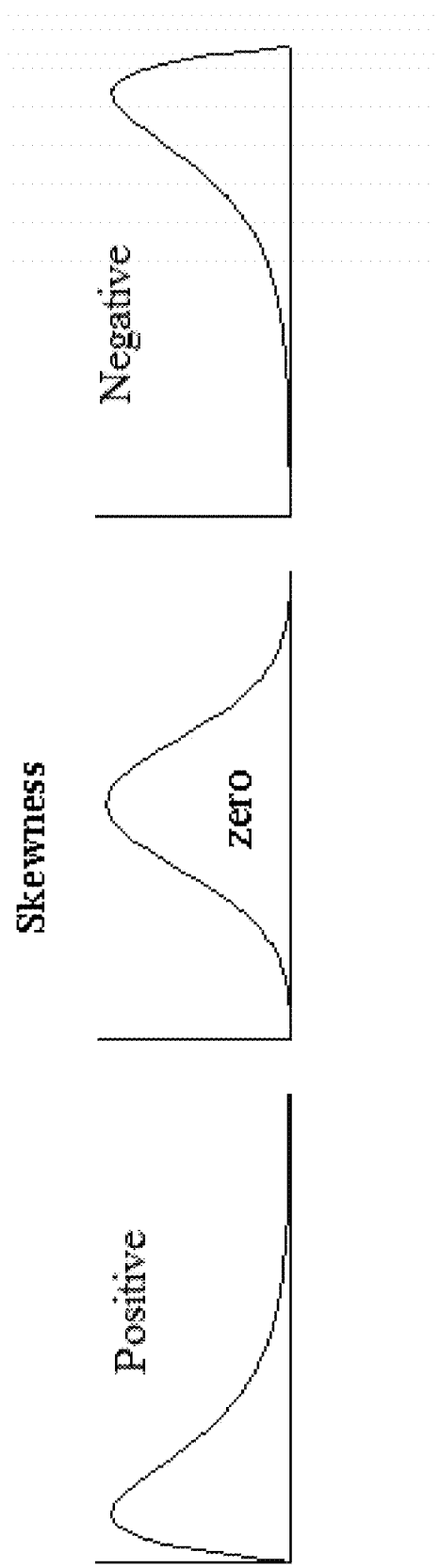
FIG. 5 illustrates statistical distributions with different types of skewness.

In this second embodiment of compression pre-testing, one plots the energy intensity data points for each variable (e.g., each identical machine) in separate histograms and examines the histograms for skewness. Examples of different types of skewness are illustrated in FIG. 5

A right-skewed (positively skewed) energy intensity distribution will provide more opportunities for energy saving by variability reduction than a left-skewed distribution. Also, the energy saving amount is directly related to the amount of production. A parameter calculated based on each of the variability of energy intensity, energy intensity skewness, and total amount of production for a particular machine, production line, or other production unit may be utilized to perform prioritization in a compression pre-testing analysis.

In one embodiment a parameter utilized to perform prioritization in a compression pre-testing analysis is calculated by first calculating energy intensity data points by dividing energy input by the product output for each data point for each production unit. The energy intensity values in energy intensity value distributions for the production units are separated into a list of data points having values higher than a mean value of the distribution and data points having values lesser than the mean value. The data points having values lesser than the mean value are discarded. The stan-

TABLE 3

Macro Groups

| Macro Groups | Crew | Fac Status | Mixer mode | Recipe |
| --- | --- | --- | --- | --- |
| v__3114__3111 | Gamma | Active | MaltOnly | MaltMilk |
| | Gamma | Active | MaltOnly | ChocMalt |
| v__3125__3122 | Gamma | Active | FullOnly | StrawMilk |
| | Gamma | Active | FullOnly | ChocMilk |
| v__2125__1122__2122__1125 | Beta | Active | FullOnly | StrawMilk |
| | Alpha | Active | FullOnly | ChocMilk |
| | Beta | Active | FullOnly | ChocMilk |
| | Alpha | Active | FullOnly | StrawMilk |
| v__4236__1136__1133__4233__2133__2136__3133__3136 | ShiftChange | Standby | SkimOnly | StrawSkim |
| | Alpha | Active | SkimOnly | StrawSkim |
| | Alpha | Active | SkimOnly | ChocSkim |
| | ShiftChange | Standby | SkimOnly | ChocSkim |
| | Beta | Active | SkimOnly | ChocSkim |
| | Beta | Active | SkimOnly | StrawSkim |
| | Gamma | Active | SkimOnly | ChocSkim |
| | Gamma | Active | SkimOnly | StrawSkim |

As can be seen in Table 3, most of the energy intensity differences are due to the mixer mode, but the difference between the two middle groups is just due to the crews which may suggest that training or proficiency differences dard deviations of the remaining data points from each distribution are then calculated and these standard deviations are multiplied by the total production of each respective production unit to yield the prioritization parameters. The prioritization parameters for each production unit can then be charted in a Pareto chart. The production units exhibiting the highest prioritization parameters may be selected as providing a higher opportunity for energy intensity variation reduction and energy savings as compared to production units exhibiting lower prioritization parameters.

Compression Analysis (Energy Saving Quantification):

Once the Macro Groups or production units (hereinafter "production entities") have been prioritized for analysis, production entities exhibiting the greatest potential for energy intensity variability reduction may be analyzed to determine associated potential cost savings. To perform this analysis, the energy intensity data set for the production entity is broken into sets of data points having values that are one standard deviation or more from the mean energy intensity value, data points having values that are two standard deviations or more from the mean energy intensity value, data points having values that are three standard deviations or more from the mean energy intensity value, etc. A count of data points falling into each of these groups is divided by the total number of data points in all groups to determine an occurrence frequency for each group. The production volume value associated with each data point in each group is multiplied by the energy intensity value of each data point to convert the groups of energy intensity data points to groups of energy consumption data points. The number of data points in each group of energy consumption data points is increased to form respective derivative groups by adding additional data points to each group having values of the mean value of each respective group until the number of data points in each derivative group is equal to the total number of data points in the original full data set for the production entity. The energy saving value for each group is then calculated by subtracting the summation of the of energy consumption data points in each group from a calculated hypothetical value where all of the points with a higher variability are reduced to the lower limit of the current grouping.

Figure 6:
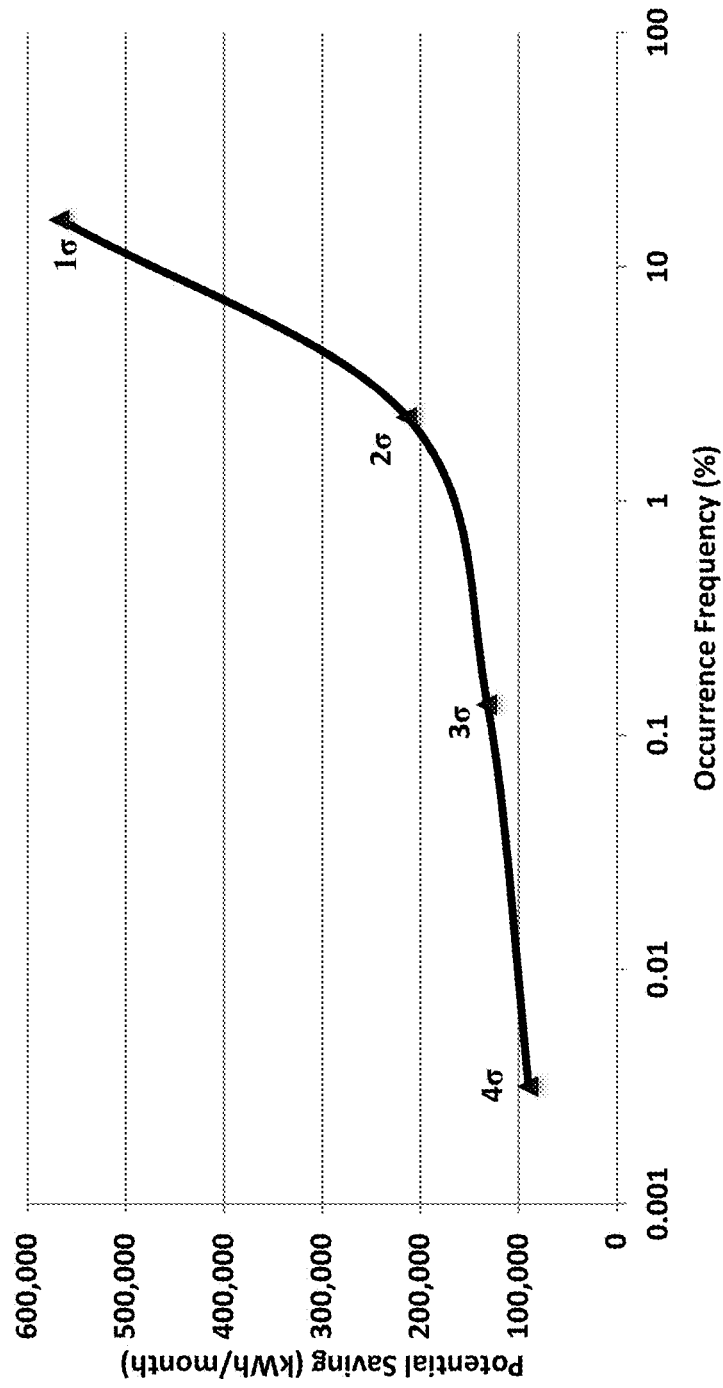
FIG. 6 is a chart illustrating energy saving opportunities associated with reduction in energy intensity variability for a production entity.

Visualization of Analysis Results:

The potential energy savings for each group and the respective occurrence frequencies may then be plotted, for example, as illustrated in FIG. 6, to show how much savings may be achieved by eliminating various degrees of variability in energy intensity for the production entity. For example, the data plot of FIG. 6 indicates that if about 0.1% of instances where the energy intensity variability is more than three sigma from the mean energy intensity for the production entity can be reduced to three sigma, 130,000 kWh per month could be saved.

Similar potential energy savings analysis may be performed for the various production entities in a facility determined to be potential sources of energy savings. The potential energy savings may be compared with estimated costs for reducing the energy intensity variability to determine if the costs are sufficiently low as compared to the potential savings to implement actions to reduce the observed energy intensity variability.

Change-Point Detection

To determine a root cause for energy intensity variation of a production entity (for example, a piece of production equipment), it is useful to determine when energy events contributing to the energy intensity variation occurred so that an investigation regarding potential contributing factors may be conducted. A determination of when energy events contributing to the energy intensity variation occurred may be performed by comparing energy intensity data from a production entity to a data model for that variable.

A data model can generally be described as a mathematical equation which describes the relation between a pair of dependant and independent variable. In an ideally stable system, the dependant variable can be well predicted by the model with a negligible amount of error. However, in real systems, the model evolves over time by any change in the system condition. System aging, change in the environmental condition and variation of the inputs are some of the reasons for model evolution. One of the most interesting pieces of information one can obtain out of a historical dataset is these change-point events that have happened back in time.

CUSUM charts are well-known tools to monitor the stability of a system and detecting the change-points. A CUSUM chart may created by cumulatively summing up differences between data model predicted system behavior and actual system behavior, referred to as error values. The flat areas in a CUSUM chart may be interpreted as stable regions and any extremums in a CUSUM chart represent a change in the system behavior. There are two main issues related to CUSUM chart visual interpretation. First, there is typically no parameter quantifying the significance of each change point, and second, not all of the events are easily detectable by just looking at the chart.

In accordance with the present disclosure, two analysis methods are combined to compensate the issues of the CUSUM chart analysis. Bootstrapping (BS) provides the confidence level and the Mean Square Error (MSE) finds the exact location of the change events. This combined analysis method may be automated into a robust tool capable of handling huge historical datasets regardless of the number of change-points in them. All the significant change-point events will be accurately detected with a corresponding confidence level. Moreover, this tool can be used in real-time process monitoring as it is capable of detecting events shortly after the occurrence.

Bootstrapping:

Assume $X_{Actual}$ to be the dependent variable in a data set. Having the mathematical model, $X_{Model}$, one is able to work out the CUSUM parameter as follows, $$X_i = X_{Model} - X_{Actual}$$

$$\text{Error} = X_i - \bar{X}_i$$

$$\text{CUSUM} = \text{Cumulative Summation } \{\text{Error}\}$$

Another important parameter is the CUSUM range which is defined as the difference between the maximum and minimum of the CUSUM ($S_{diff}$).

The Bootstrap test is performed by randomly sampling the data without replacement. The idea comes from the fact that if no significant change has happened, the random reordered data will possibly result in a similar CUSUM chart with a more less the same CUSUM range. Otherwise, the CUSUM behavior is due to a real change rather than randomness.

An embodiment of the Bootstrap test procedure is as follows:
1) Randomly reorder the error function.
2) Recalculate the Bootstrap CUSUM from the new error function.
3) Calculate the Bootstrap CUSUM range ($S_{diff}^0$)
4) Check if the ($S_{diff}^0$) is bigger than ($S_{diff}$)

The above procedure should be done for a large number of Bootstrap samples and the confidence level will be calculated as, $$\text{Confidence Level (\%)} = \frac{\text{Count } \{S_{diff}^0 < S_{diff}\}}{N} \times 100$$

Where the numerator is the number of times when the CUSUM range was bigger than the Bootstrap CUSUM range, and N is the total number of Bootstrap samples. In some embodiments, a confidence level between about 90% and about 95% is enough to state that a statistically significant change has occurred. As the number of Bootstrap samples increase, better estimations can be made. In some embodiments, N~1,000 is a sufficient number of Bootstrap samples.

Figure 7A:
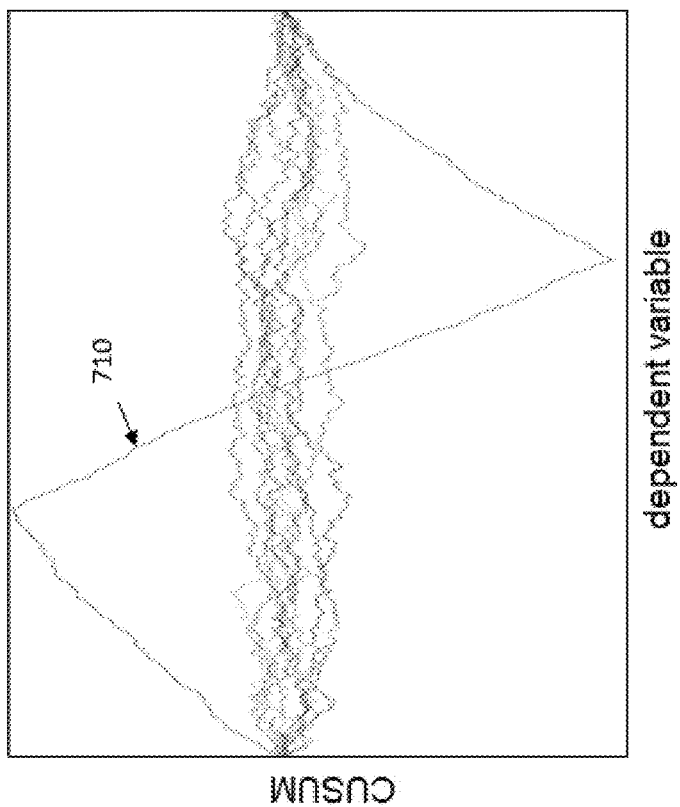
FIG. 7A is a first CUSUM bootstrapping chart of an example data set.
Figure 7B:
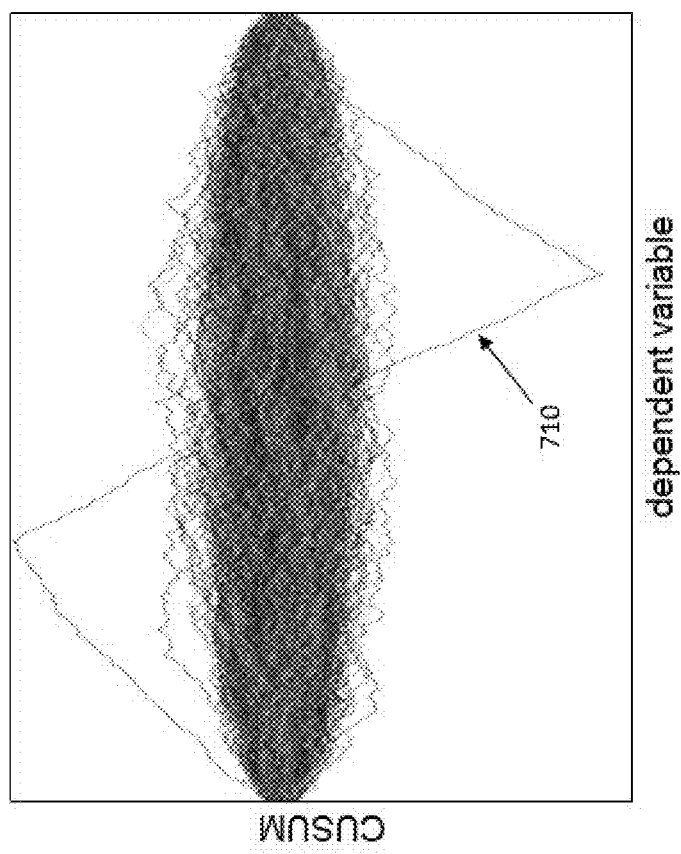
FIG. 7B is a second CUSUM bootstrapping chart for the example data set used in the chart of FIG. 7A.

FIGS. 7A and 7B show the CUSUM chart (indicated at 710) and the Bootstrap CUSUM charts for a step detection process. FIG. 7A shows 10 Bootstrap samples while FIG. 7B shows 1,000 samples. The confidence level in both cases is 100% which means that there is at least one significant change point in the dataset.

Mean Square Error (MSE):

The Mean Square Error test is an estimator of when a change in the statistical parameters of a dataset has happened. The idea of the MSE is to split the data into two segments and use two different models for each segment. The error function will be recalculated for each segment. The minimum point in the total error curve will show where the two new models best fit the two segments and this is where the event has happened. In some instances there might be more than one change-point event in the data and the minimum of the MSE will locate the most significant one.

The MSE is defined as, $$X_i = X_{Model} - X_{Actual}$$

$$X1_{avg} = \sum_{i=1}^{m} \frac{X_i}{m}$$

$$X2_{avg} = \sum_{i=m+1}^{end} \frac{X_i}{(end - m)}$$

$$MSE(m) = \sum_{i=1}^{m} (X_i - X1_{avg})^2 \Big| \sum_{i=m+1}^{end} (X_i - X2_{avg})^2$$

Figure 8:
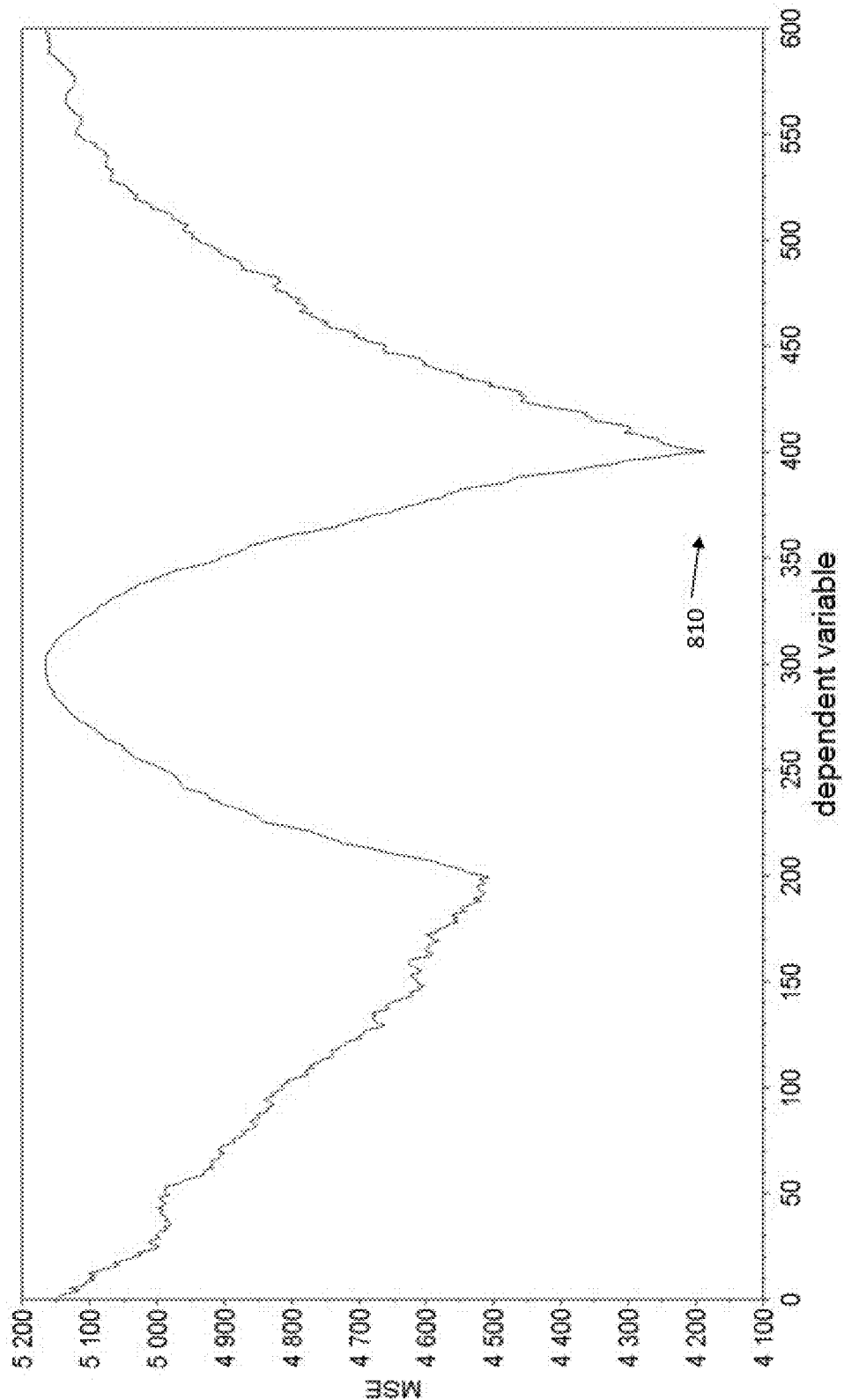
FIG. 8 is a Mean Square Error chart for the example data set used in the chart of FIG. 7A.

FIG. 8 illustrates the MSE plot of the same data set utilized to produce the CUSUM charts in FIGS. 7A and 7B. Each minimum point in the chart of FIG. 8 is related to a step (change-point event). The change-point associated with the minimum in the curve on the right, indicated at 810, is the major detected change-point.

BS-MSE Test and Results:

The Bootstrapping and Mean Square Error test methods may be combined to form an event detection algorithm. The BS-MSE test consists of three steps at each stage:
1) Perform the Bootstrap test and if the confidence level is high enough go to the next step.
2) Perform the Mean Square error test and identify the major event.
3) Split the data into two parts: before and after the major event.

This procedure is repeated until no more significant events are found.

Figure 9:
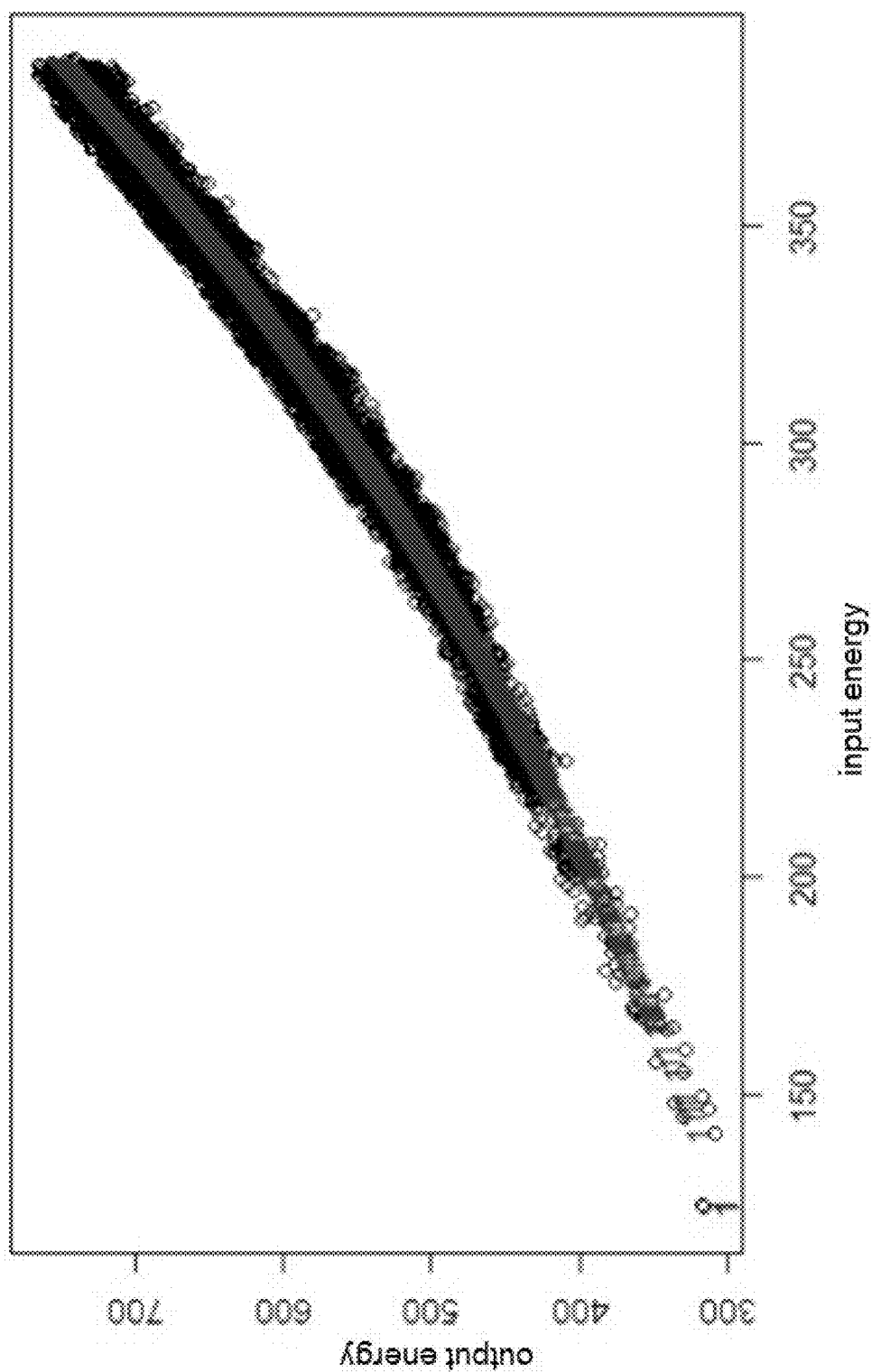
FIG. 9 is a plot of energy output vs. energy input of an example system.

As an example of the BS-MSE test application, a pumping system data set is analyzed. FIG. 9 is a plot the output energy of the system versus the input energy, depicted by the black circles. The line in the plot represents the mathematical model for the pumping system data.

Figure 10:
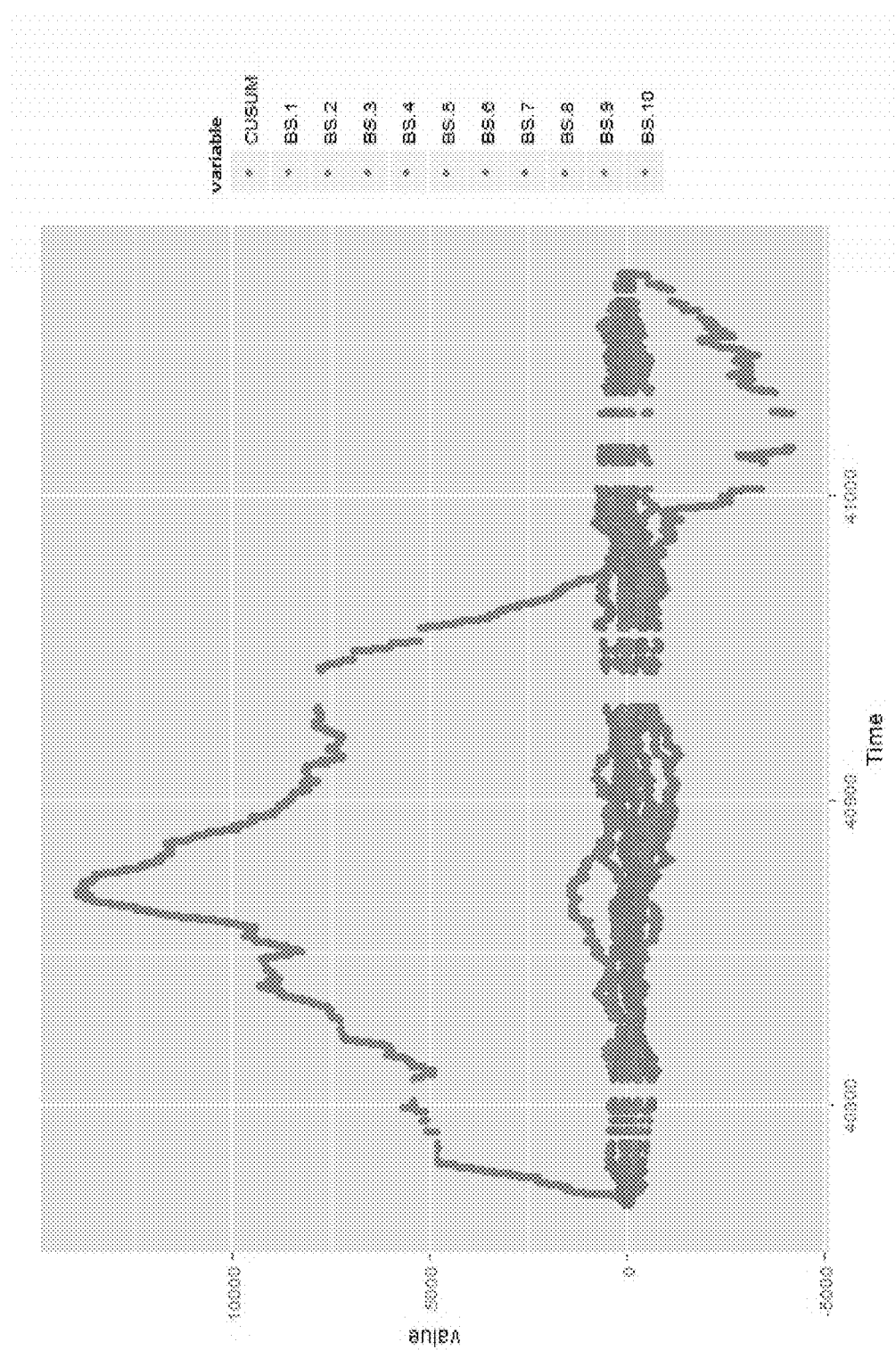
FIG. 10 is a CUSUM bootstrapping chart for the data set used in the plot of FIG. 9.

First is to calculate the error function and the CUSUM. Next, a Bootstrap test will be performed to obtain the confidence level. FIG. 10 illustrates the CUSUM chart and 10 other Bootstrap CUSUM charts.

Figure 11:
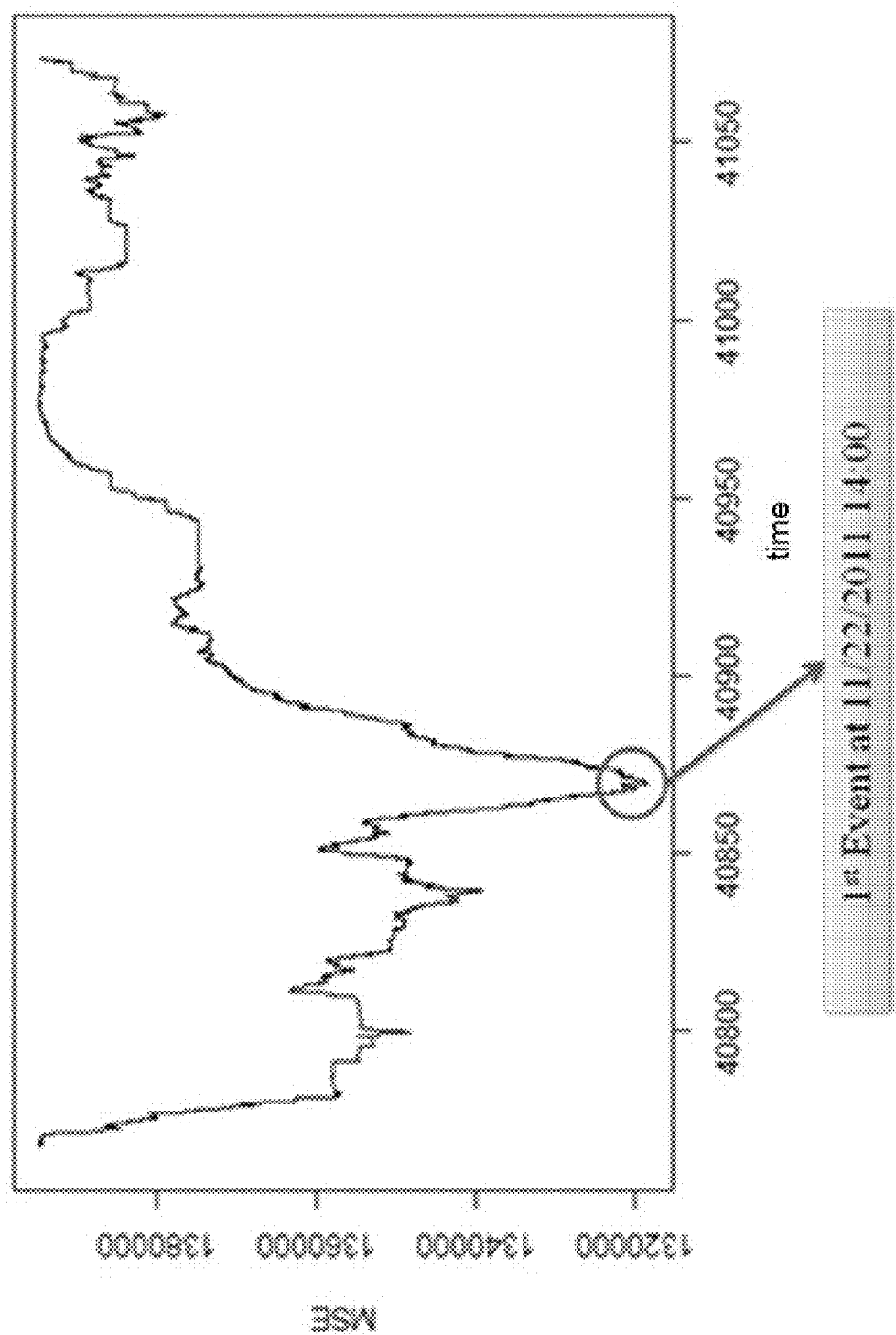
FIG. 11 is a Mean Square Error chart for the data set used in the plot of FIG. 9.

After doing the Bootstrap test for 1000 samples, a confidence level of 100% is obtained. The next step is to perform the MSE analysis. FIG. 11 is a plot of the resultant MSE chart. The major change-point event is indicated at 1110.

Figure 12:
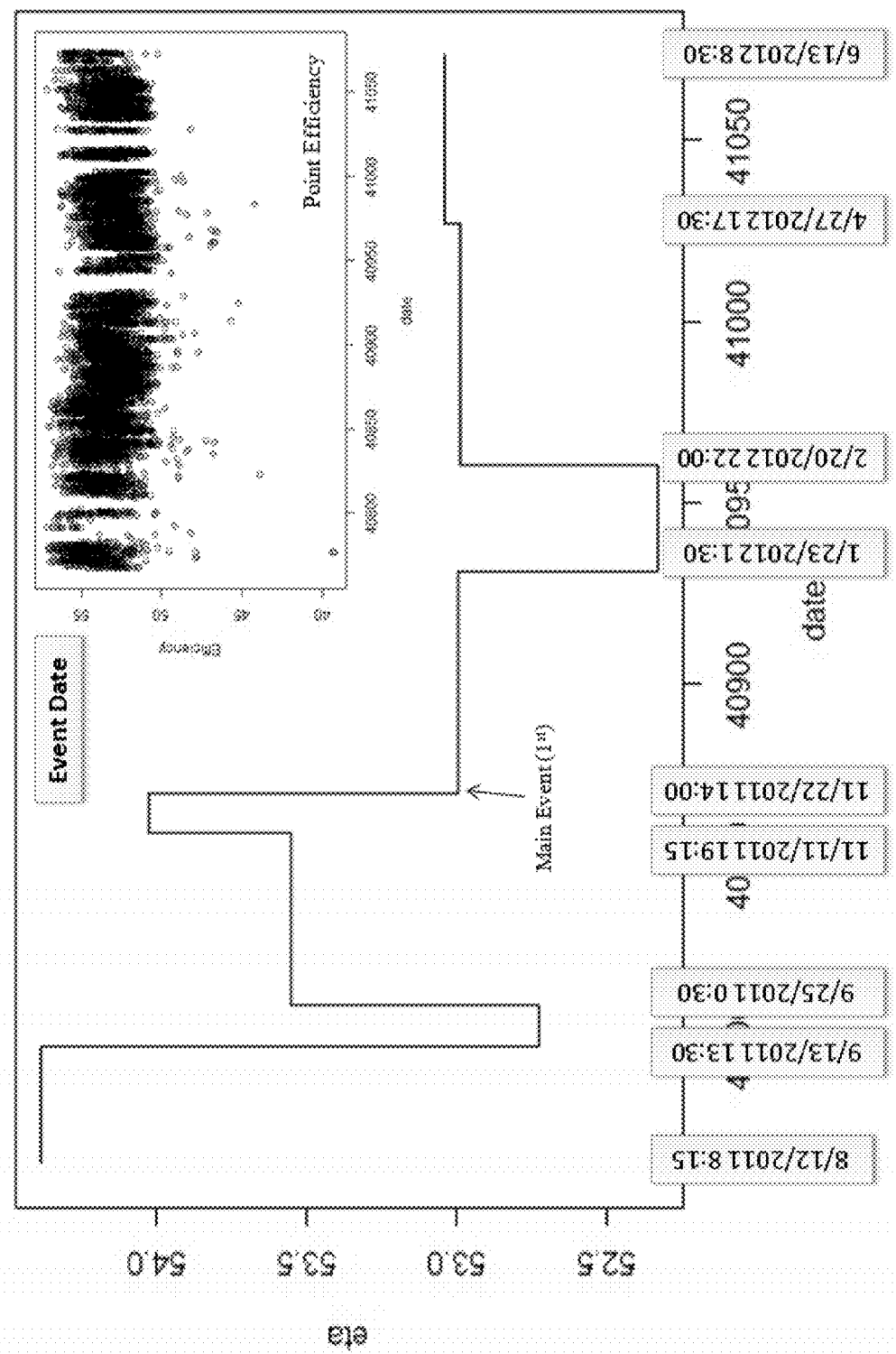
FIG. 12 is a BS-MSE chart for the data set used in the plot of FIG. 9.

The data is then split into two parts and the same BS-MSE procedure is repeated for each part. This procedure is repeated until no more significant events are found. In the present example, seven statistically significant change events were found. To illustrate them, averaged energy efficiency is plotted FIG. 12. A chart of the individual data points for energy efficiency is presented as an inset.

Figure 13:
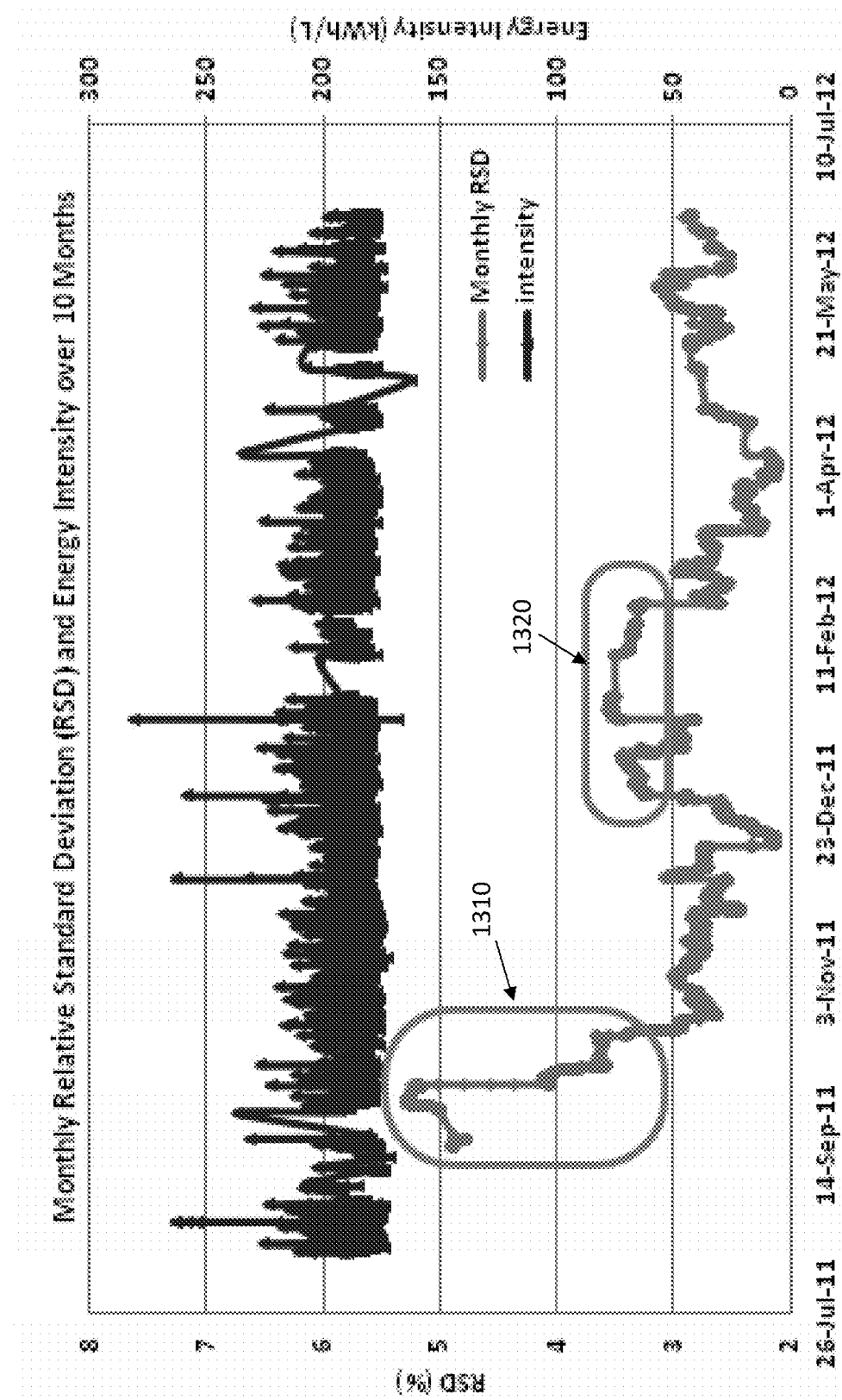
FIG. 13 is relative standard deviation chart of an example data set.

Relative Standard Deviation Analysis:

Another method of detecting the occurrence of energy intensity variability change events in a system involves the analysis of relative standard deviations of the energy intensity data from the system. Relative Standard Deviation (RSD) is a parameter to illustrate the variation and stability of different sets of data regardless of the amount of production and the average energy intensity. It is defined as the standard deviation in the data within a defined time period, for example, a month, divided by the mean of the data within the defined time period multiplied by 100. FIG. 13 illustrates a monthly RSD plot for one hypothetical energy intensity data set. To identify periods of high energy intensity variation that may be indicative of a change event that should be investigated, periods of time where the monthly RSD were above the average should be identified. In FIG. 13, two periods of time indicated at 1310 and 1320 show periods of high relative standard deviation and represent periods of time that may be flagged for further investigations. In some instances, a general trend might be detectable; for example, a global increase or decrease in stability or a change with season might be observed, which may also provide an indication of time periods or production entities that should be flagged for further investigation. Other periods of time, for example, a day rather than a month may be selected for the defined time period for an RSD plot to provide for more real-time monitoring.

Once an energy intensity variation change event is detected with any one or more of the above methods, an investigation into the root cause of the event may be performed. For example, if an energy intensity variability change event is detected by Bootstrapping, MSE, or BS-MSE analysis, compression testing and/or ANOVA analysis of various factors that may have influenced the energy intensity variability of the particular production entity analyzed may be performed. Over time, as different energy intensity variability change events are detected and root causes identified and resolved, a database may be constructed relating a "signature" of different energy intensity variability change events to their root causes. For example, it may be discovered that a particular type of production equipment exhibits energy intensity variability change events where the energy intensity variability changes by a certain amount or in a certain direction in response to a particular cause, for example, a cooling system error, a missed preventative maintenance event, or other identifiable root cause. The nature of the energy intensity variability change events for the type of production equipment and the root cause for the events may be associated in a database. If similar energy intensity variability change events for a similar type of production equipment are later observed, the database can be used to direct facility personnel to the previously determined root cause as a likely root cause to be addressed to resolve the energy intensity variability change events for the similar type of production equipment. In some embodiments, the root cause is addressed by adjusting one or more operating parameters of a production entity and/or one or more operating parameters of ancillary equipment, for example, chemical, water, air, or power supplies, or environmental controls associated with the production entity. Or, the root cause can be addressed through staff training for behavioral issues that impact energy intensity.

Computer System:

In some embodiments, one or more of the methods disclosed herein may be implemented on a computerized control system. Various aspects may be implemented as specialized software executing in a general-purpose or specialized computer system 1400 such as that shown in FIG. 14. The computer system 1400 may include a processor 1402 connected to one or more memory devices 1404, such as a disk drive, solid state memory, or other device for storing data. Memory 1404 is typically used for storing programs and data during operation of the computer system 1400.

Components of computer system 1400 may be coupled by an interconnection mechanism 1406, which may include one or more busses (e.g., between components that are integrated within a same machine) and/or a network. The interconnection mechanism 1406 enables communications (e.g., data, instructions) to be exchanged between system components of system 1400. Computer system 1400 includes one or more input devices 1408, for example, a keyboard, mouse, trackball, microphone, or touch screen through which an operator may issue commands or programming to the system 1400. In some embodiments the computer system 1400 may include or be coupled to or in communication with one or more input devices 1408 configured to communicate with production entities 1416 of a facility or a computer system at a facility including data related to the power consumption and production of the production entities 1416 and read such data from the production entities 1416 and/or computer system at the facility. Computer system 1400 includes one or more output devices 1410, for example, a printing device, display screen, and/or speaker. In some embodiments, the computer system 1400 may include or be coupled to or in communication with one or more output devices 1410 configured to provide control signals to adjust one or more operating parameter of production entities 1416 of a facility and/or ancillary equipment 1418 associated with the production entities 1416. One or more sensors 1414 may also provide input to the computer system 200. These sensors may include, for example, sensors which are capable of or configured to measure one or more parameters of power delivered to or consumed by production entities 1416 of a facility, for example, power meters or monitors. In addition, computer system 1400 may contain one or more interfaces (not shown) that connect computer system 1400 to a communication network in addition or as an alternative to the interconnection mechanism 1406. These interfaces may be utilized by the central processing unit to collect data, for example, energy consumption and production data from one or more production entities at a customer's facility or data regarding same stored in a database at a customer's facility.

Other data, for example, environmental data such as data related to temperature and/or humidity or information regarding the presence or absence of storms or other environmental events in a location of the facility in which the production entities being monitored or analyzed are located may also be provided to the computer system 1400 to facilitate analysis of the data associated with the production entities and/or to facilitate determining an appropriate response. The environmental data may, in some embodiments, be provided along with data from the production entities, and in other embodiments, may be obtained from a separate system, for example, a weather reporting web site on the internet. In some embodiments, the computer system 1400 may obtain geographic data regarding the location of the facility in which the production entities being monitored or analyzed is located and utilize this geographic data to look up the environmental data, for example, over the internet or from a weather reporting service. The computer system 1400 may associate the environmental data with data regarding the energy intensity variation of the production entities.

Figure 15:
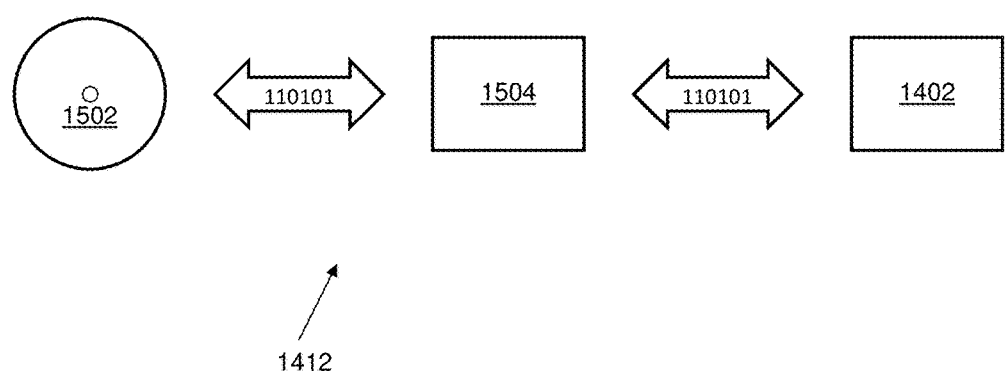
FIG. 15 is a schematic illustration of a memory system for the computer system of FIG. 14.

The storage system 1412, shown in greater detail in FIG. 15, typically includes a computer readable and writeable nonvolatile recording medium 1502 in which signals are stored that define a program to be executed by the processor or information to be processed by the program. The medium may include, for example, a disk or flash memory. Typically, in operation, the processor causes data to be read from the nonvolatile recording medium 1502 into another memory 1504 that allows for faster access to the information by the processor than does the medium 1502. This memory 1504 is typically a volatile, random access integrated circuit memory such as a dynamic random access memory (DRAM) or static memory (SRAM). It may be located in storage system 1412, as shown, or in memory system 1404. The processor 1402 generally manipulates the data within the integrated circuit memory 1504 and then copies the data to the medium 1502 after processing is completed. A variety of mechanisms are known for managing data movement between the medium 1502 and the integrated circuit memory element 1504, and embodiments disclosed herein are not limited to any particular data movement mechanism. Embodiments disclosed herein are not limited to a particular memory system 1404 or storage system 1412.

The computer system may include specially-programmed, special-purpose hardware, for example, an application-specific integrated circuit (ASIC). Embodiments disclosed herein may be implemented in software, hardware or firmware, or any combination thereof. Further, such methods, acts, systems, system elements and components thereof may be implemented as part of the computer system described above or as an independent component.

Figure 14:
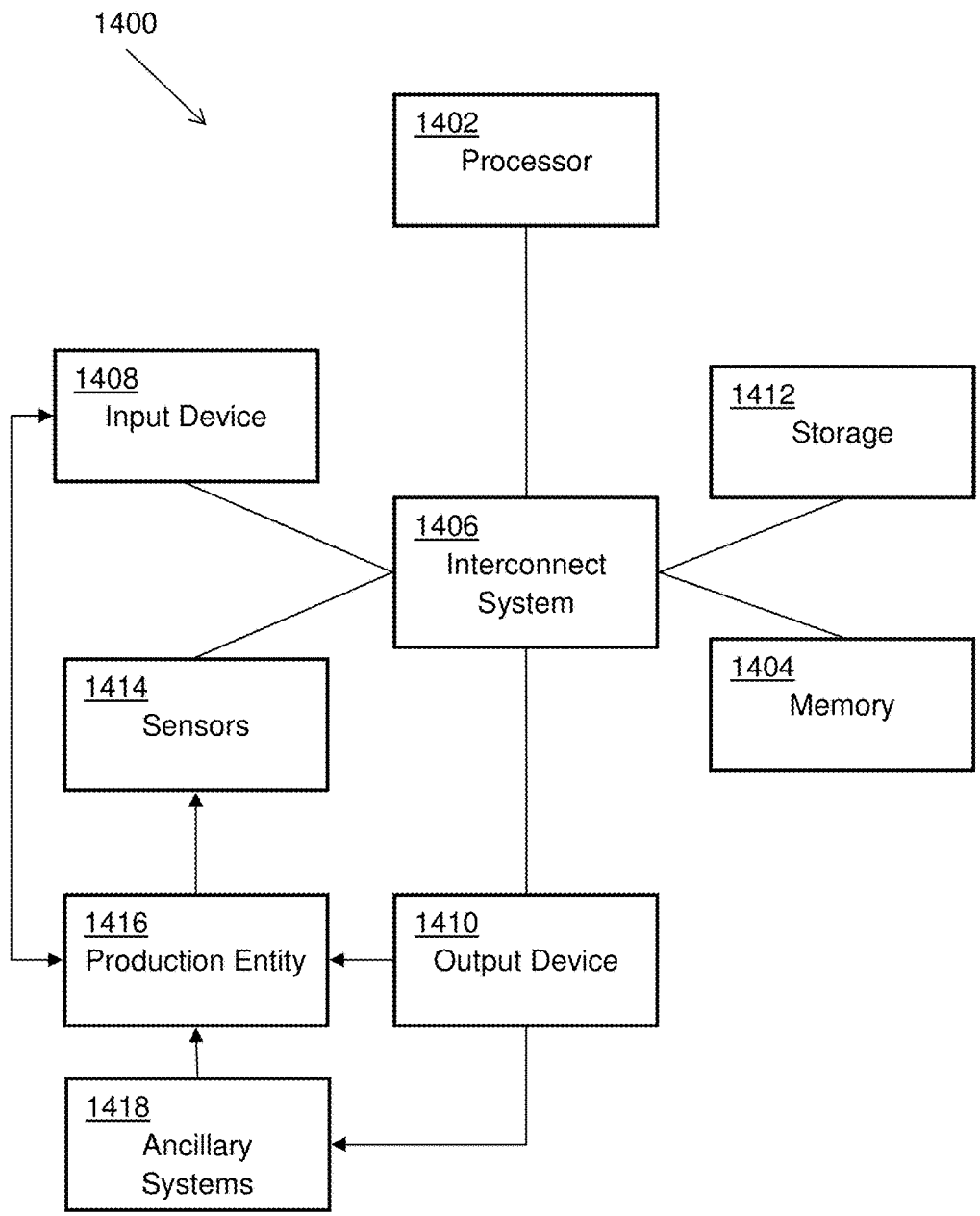
FIG. 14 is a schematic illustration of a computer system upon which methods disclosed herein may be performed.

Although computer system 1400 is shown by way of example as one type of computer system upon which various embodiments disclosed herein may be practiced, it should be appreciated that the embodiments disclosed herein are not limited to being implemented on the computer system as shown in FIG. 14. Various embodiments disclosed herein may be practiced on one or more computers having a different architecture or components that that shown in FIG. 14.

Computer system 1400 may be a general-purpose computer system that is programmable using a high-level computer programming language. Computer system 1400 may be also implemented using specially programmed, special purpose hardware. In computer system 1400, processor 1402 is typically a commercially available processor such as the well-known Pentium™ or Core™ class processors available from the Intel Corporation. Many other processors are available. Such a processor usually executes an operating system which may be, for example, the Windows 7 or Windows 8 operating system available from the Microsoft Corporation, the MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that embodiments disclosed herein are not limited to a particular computer system platform, processor, operating system, or network. Also, it should be apparent to those skilled in the art that the embodiments disclosed herein are not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various embodiments disclosed herein may be distributed among one or more computer systems configured to provide a service (e.g., servers) to one or more client computers, or to perform an overall task as part of a distributed system. For example, various embodiments disclosed herein may be performed on a client-server system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP). In some embodiments one or more components of the computer system 1400 may communicate with one or more other components over a wireless network, including, for example, a cellular telephone network.

It should be appreciated that embodiments disclosed herein are not limited to executing on any particular system or group of systems. Also, it should be appreciated that embodiments disclosed herein are not limited to any particular distributed architecture, network, or communication protocol. Various embodiments may be programmed using an object-oriented programming language, such as Small-Talk, Java, C++, Ada, or C# (C-Sharp). Other object-oriented programming languages may also be used. Alternatively, functional, scripting, and/or logical programming languages may be used. Various embodiments disclosed herein may be implemented in a non-programmed environment (e.g., documents created in HTML, XML or other format that, when viewed in a window of a browser program, render aspects of a graphical-user interface (GUI) or perform other functions). Various embodiments disclosed herein may be implemented as programmed or non-programmed elements, or any combination thereof.

Having thus described several aspects of at least one embodiment of this invention, it is to be appreciated various alterations, modifications, and improvements will readily occur to those skilled in the art. For example, although the examples provided herein focus on energy intensity analysis, this same approach could be used for example, to identify high cost events associated with parameters other than energy intensity. Interval data for billable parameters (consumption, peak demand, power factor, etc.) can be combined to generate interval cost values, and the methods disclosed herein can be used to find and target high-cost events. Any feature described in any embodiment may be included in or substituted for any feature of any other embodiment. Acts of methods disclosed herein may be performed in alternate orders, and one or more of the acts may be omitted or replaced by an alternative act. The methods disclosed herein may include additional acts not explicitly described. Such alterations, modifications, and improvements are intended to be part of this disclosure, and are intended to be within the scope of the invention. Accordingly, the foregoing description and drawings are by way of example only.

What is claimed is:

1. A method for reducing energy costs at a facility, the method comprising:
   reading data related to power consumption and production of production entities at the facility via one or more input devices of a control system associated with the facility;
   identifying, by a computer processor of the control system, candidate production entities at the facility having energy intensity distributions with positive skew towards high energy intensity values;
   identifying, by the computer processor, a root cause for energy intensity variation in the candidate production entities, identifying the root cause for energy intensity variation in the candidate production entities including determining a time of a change in energy intensity variation in the candidate production entities through a method of change-point detection, the method of change-point detection including a bootstrapping analysis; and
   causing, by an output device of the control system, an action to be performed to mitigate the root cause by adjusting one of one or more operation parameters of the one or more of the candidate production entities by providing one or more control signals to the one or more of the candidate production entities or one or more operation parameters of one or more ancillary systems associated with one or more of the candidate production entities by providing one or more control signals to the one or more of the ancillary systems.

2. The method of claim 1, wherein the candidate production entities are identified through compression pre-testing.

3. The method of claim 2, wherein the compression pre-testing includes combining a first energy intensity dataset associated with a first group of variables with a second energy intensity dataset statistically similar to the first data set and associated with a second group of variables into a composite macro group variable for analysis.

4. The method of claim 3, wherein the compression pre-testing includes combining statistically similar datasets associated with a plurality of groups of variables into a plurality of composite macro group variables, each of the composite macro group variables having statistically different associated data sets.

5. The method of claim 4, wherein the root cause is identified through analysis of parameters of variables included in each macro group variable, the analysis including identifying one or more variables that have different values in different of the macro group variables as being related to the root cause.

6. The method of claim 2, wherein the compression pre-testing includes ranking of parameters derived from each of variability of energy intensity, energy intensity skewness, and total amount of production for each of the candidate production entities.

7. The method of claim 1, wherein the bootstrapping analysis includes:

calculating a first CUSUM range of error values for a data set including time ordered values of a variable identified as being associated with the root cause;

randomly reordering the values of the variable in the data set to create a plurality of randomly reordered data sets;

calculating CUSUM ranges of error values for the plurality of randomly reordered data sets; and determining if the first CUSUM range of error values differs from the CUSUM ranges of error values for the plurality of randomly reordered data sets with a confidence level more than a predetermined confidence level.

8. The method of claim 1, wherein the method of change-point detection includes a Mean Square Error analysis.

9. The method of claim 1, wherein the method of change-point detection includes a BS-MSE analysis.

10. The method of claim 1, wherein the method of change-point detection includes a relative standard deviation analysis.

11. The method of claim 1, wherein the root cause is determined by comparison of a signature of the energy intensity variation in the candidate production entities with a database of energy intensity variation signatures and associated root causes.

12. A computer system comprising:

a processor configured to perform a method including:

reading data related to power consumption and production of production entities at a facility via one or more input devices of a control system associated with the facility;

identifying candidate production entities at the facility having energy intensity distributions with positive skew towards high energy intensity values;

identifying a root cause for energy intensity variation in the candidate production entities, identifying the root cause for energy intensity variation in the candidate production entities including determining a time of a change in energy intensity variation in the candidate production entities through a method of change-point detection, the method of change-point detection including a bootstrapping analysis;

causing an action to be performed to mitigate the root cause; and an output device configured to provide control signals to one or more of the candidate production entities or one or more ancillary systems associated with one or more of the candidate production entities, wherein causing the action to be performed to mitigate the root cause includes adjusting one or more operation parameters of the one or more of the candidate production entities or one or more ancillary systems by providing one or more control signals from the output device to the one or more of the candidate production entities or one or more ancillary systems.

13. The computer system of claim 12, configured to identify the root cause for energy intensity variation in the candidate production entities by a method including determining a time of a change in energy intensity variation in the candidate production entities though a method of change-point detection.

14. The computer system of claim 12, further comprising a database, wherein the processor is configured to determine the root cause is by comparing a signature of the energy intensity variation in the candidate production entities with energy intensity variation signatures and associated root causes stored in the database.

15. A non-transitory computer readable media including instructions that when executed on a computer system cause the computer system to perform a method comprising:

reading data related to power consumption and production of production entities at a facility via one or more input devices;

identifying candidate production entities at the facility having energy intensity distributions with positive skew towards high energy intensity values;

identifying a root cause for energy intensity variation in the candidate production entities, identifying the root cause for energy intensity variation in the candidate production entities including determining a time of a change in energy intensity variation in the candidate production entities through a method of change-point detection, the method of change-point detection including a bootstrapping analysis; and causing an action to be performed to mitigate the root cause by adjusting one of one or more operation parameters of the one or more of the candidate production entities by providing one or more control signals to the one or more of the candidate production entities or one or more operation parameters of one or more ancillary systems associated with one or more of the candidate production entities by providing one or more control signals to the one or more of the ancillary systems.

16. The method of claim 1, further comprising determining, by the computer processor, potential cost savings associated with reducing energy intensity variation in the candidate production entities.

* * * * *